United States Patent
Radhakrishnan et al.

(10) Patent No.: US 9,699,628 B2
(45) Date of Patent: Jul. 4, 2017

(54) MESSAGE BLOCKER

(71) Applicant: Verizon Patent and Licensing Inc., Basking Ridge, NJ (US)

(72) Inventors: Vijayan Radhakrishnan, Chennai (IN); Sridevi Rajendran, Chennai (IN); Vijay A. Senthil, Chennai (IN); Vinodkrishnan Surianarayanan, Chennai (IN); Parthasarathi Kathiresan, Chennai (IN); Rajasundaram Ganesan, Chennai (IN); SriKamal Boyina, Chennai (IN); Anand Chandrasekar, Chennai (IN); Ramya Sundarraman, Chennai (IN); Prabhu V. Mohan, Chennai (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 53 days.

(21) Appl. No.: 14/815,132

(22) Filed: Jul. 31, 2015

(65) Prior Publication Data
US 2017/0034674 A1   Feb. 2, 2017

(51) Int. Cl.
H04W 4/14   (2009.01)
H04W 8/22   (2009.01)
H04W 4/22   (2009.01)

(52) U.S. Cl.
CPC .............. *H04W 4/14* (2013.01); *H04W 4/22* (2013.01); *H04W 8/22* (2013.01)

(58) Field of Classification Search
CPC ............ H04W 4/14; H04W 8/22; H04W 4/22

USPC ................ 455/418–420, 569.1–569.2, 575.9
See application file for complete search history.

(56) References Cited

U.S. PATENT DOCUMENTS

| | | | | |
|---|---|---|---|---|
| 7,966,025 B1* | 6/2011 | O'Neil | ................... | H04W 48/04 455/404.2 |
| 8,340,730 B2* | 12/2012 | Pallotta | ............. | H04M 1/72577 455/404.1 |
| 8,417,268 B1* | 4/2013 | Halferty | ................ | H04W 4/027 455/410 |
| 8,897,820 B2* | 11/2014 | Marovets | ................ | H04W 4/14 455/418 |
| 8,995,945 B2* | 3/2015 | Ewell, Jr. | ............... | H04W 48/04 455/404.1 |
| 9,150,154 B2* | 10/2015 | Miller | ..................... | B60Q 9/008 |
| 2011/0009107 A1* | 1/2011 | Guba | ........................ | G08G 1/20 455/418 |
| 2011/0105097 A1* | 5/2011 | Tadayon | ................ | H04W 4/025 455/418 |
| 2011/0151842 A1* | 6/2011 | Olincy | .............. | H04M 3/42348 455/414.1 |

(Continued)

*Primary Examiner* — Sharad Rampuria

(57) ABSTRACT

A method, a device, and a non-transitory storage medium provide to determine whether a user of the user device is being transported by a vehicle; determine whether any of multiple events pertaining to a message application is detected in response to a determination that the user is being transported by the vehicle; obtain input characteristic data attributed to the user in response to a determination that any of the multiple events is detected; determine whether the user is a driver of the vehicle based on the input characteristic data; and block receipt of an inbound message and a creation of an outbound message in response to a determination that the user is the driver of the vehicle.

20 Claims, 17 Drawing Sheets

(56) References Cited

U.S. PATENT DOCUMENTS

2012/0021717 A1* 1/2012 Schmidt ............ H04M 1/72577
  455/404.2
2012/0270530 A1* 10/2012 Shuster ................ H04M 19/04
  455/418

* cited by examiner

| MOTION EVALUATION TABLE 400 | | |
|---|---|---|
| ACCELERATION | VELOCITY | SPEED |
| ↑ | ↑ | ↑ |
| 405 | 410 | 415 |

Fig. 4A

| MESSAGE EVALUATION TABLE 430 ||||||
|---|---|---|---|---|---|
| SPEED | ACTIVE | PAUSE | RESPONSE TIME | RECEIPIENT | NAVIGATION |
|  |  |  |  |  |  |
| ↑ | ↑ | ↑ | ↑ | ↑ | ↑ |
| 435 | 440 | 445 | 450 | 455 | 460 |

Fig. 4B

MESSAGE BLOCKER

BACKGROUND

Mobile devices offer various services and applications to users, such as a web service, a communication service (e.g., e-mail, short messaging service (SMS), video chat, multimedia messaging service (MMS), voice service, etc.), a media service (e.g., streaming and downloading of music, video, etc.), etc. Mobile devices may access these various services via a wireless network.

BRIEF DESCRIPTION OF THE DRAWINGS

FIG. 4A is a diagram of an exemplary table that stores exemplary motion data;

FIG. 4B is a diagram of an exemplary table that stores exemplary input characteristic data.

DETAILED DESCRIPTION OF PREFERRED EMBODIMENTS

Figure 1A:
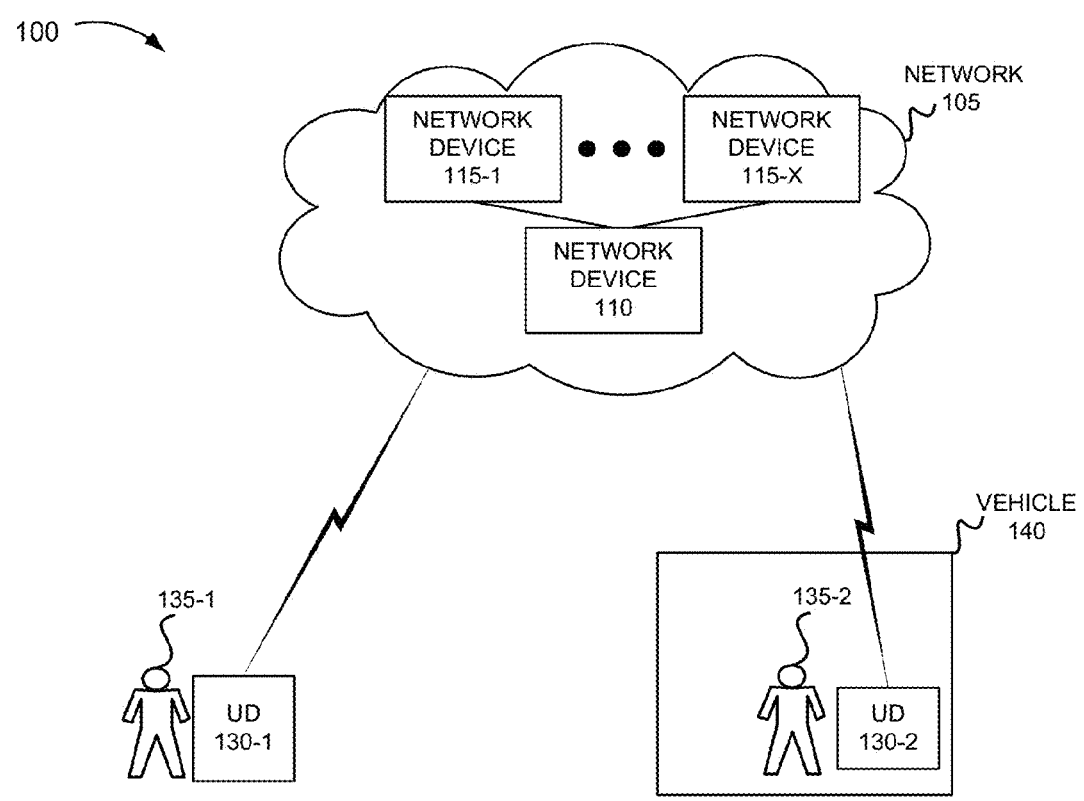
FIG. 1A is a diagram illustrating an exemplary environment in which an exemplary embodiment of a message blocker service may be implemented.

The following detailed description refers to the accompanying drawings. The same reference numbers in different drawings may identify the same or similar elements. Also, the following detailed description does not limit the invention.

Use of a mobile device while driving is a continuing problem in society. Many states have authored hands-free driving laws to help reduce the number of people that use their mobile device while driving. While social media has attempted to elevate the issue surrounding "texting while driving," users of mobile devices are still in a position to make certain choices while driving.

One challenge surrounding this issue is the ability to identify when the user is the driver of a vehicle versus simply a passenger of the vehicle. Additionally, even when the user is identified as the driver of the vehicle, a complete disablement of all communications to and from the mobile device may not be desirable. For example, the user may still wish to use hands-free features afforded by the mobile device, which may permit various forms of communications, such as placing and receiving a voice call and/or creating and receiving a message based on speech-to-text and text-to-speech capabilities. Additionally, or alternatively, other situations may arise such that even when the user is identified as the driver of the vehicle, the user is permitted to place and receive an emergency call (e.g., 911, etc.) and/or create and receive an emergency text message (e.g., emergency Short Messaging Service (SMS) message, etc.).

The term "vehicle," as used herein, includes its plain and ordinary meaning, such as a machine that is used to carry or transport a person from one place to another. Examples of a vehicle include a car, a truck, a motorcycle, public transportation vehicle (e.g., a bus, a train, a subway, etc.), and a boat.

The term "driver," as used herein, includes its plain and ordinary meaning, such as an operator of a vehicle. While a "driver" of a train, for example, may not be considered representative of the ordinary usage of the term, for the sake of brevity and consistency, the term "driver" is used instead of other terms, such as operator, engineer, rider, etc., which may used in describing a person operating a particular type of vehicle.

The term "message," as used herein, is intended to include a text message and exclude a communication that includes voice. Examples of a text message include a Short Message Service (SMS) message, an Enhanced Messaging Service (EMS) message, a Multimedia Message Service (MMS) message, an electronic mail (e-mail), a message posted on a web site (e.g., a social network post, etc.), and any other form of text message (e.g., Instant Messaging (IM) message, etc.).

According to an exemplary embodiment, a messaging blocking service is provided. According to an exemplary embodiment, the message blocking service includes a user-side service. According to another exemplary embodiment, the message blocking service includes a user-side service and a network-side service. The message blocking service blocks outbound messages from the user device based on a determination that a user of the user device is operating a vehicle (e.g., driving the vehicle). The messaging blocking service also blocks inbound messages to the user device.

According to an exemplary embodiment, the message blocking service includes a motion evaluation service. The motion evaluation service may be implemented at the user-side, the network-side, or a combination thereof. According to an exemplary embodiment, the motion evaluation service determines whether the user is in a vehicle based on various types of data that may be obtained, as described herein. For example, the user device may include an accelerometer. The motion evaluation service may use data from the accelerometer to determine whether the user device is in a vehicle. Additionally, or alternatively, the user device may include location functionalities. For example, the user device may include a Global Positioning System (GPS) receiver. The motion evaluation service may use the data from the GPS receiver to determine whether the user device is in a vehicle.

As is known in the art, a variety of other technologies and techniques may be used to obtain location data, such as Differential GPS (DGPS), assisted GPS (A-GPS), Global Navigation Satellite System (Galileo), cell tower triangulation, advanced forward link trilateration (A-FLT), Enhanced Observed Time Difference (E-OTD), Uplink Time Difference of Arrival (U-TDOA), as well as indoor positioning technologies (e.g., Wireless Local Area Network (WLAN) positioning, Bluetooth positioning, IEEE 802.11 positioning, Ultra Wide Band (UWB) positioning, indoor positioning with GPS, etc.). These technologies and techniques can provide location data (e.g., latitude and longitude, etc.) with different degrees of precision and accuracy, as well as other types of data (e.g., altitude data, timestamp data, etc.).

The motion evaluation service may obtain and/or calculate other types of data, such as speed, velocity, direction, time, etc, to determine whether the user is in a vehicle. Additionally, the user device may include other sensors or devices which may provide context data to further determine whether the user is in a vehicle. For example, the user device may include a gyroscope, a compass, a light sensor, a microphone, etc. The gyroscope can provide orientation data, the compass can provide direction data, the light sensor can provide data pertaining to the lighting conditions, and the microphone can provide auditory data. According to an exemplary implementation, the auditory data may be used to further determine that the user is inside a vehicle based on the audio characteristics indicated by the auditory data. By way of example, the spectral signature of the auditory data may indicate the acoustics inside a car or other type of vehicle. Additionally, or alternatively other sounds (e.g., the sound of the engine running, the sound of the engine accelerating, the sound of brakes of a car, a truck, a bus, etc., being applied, etc.) included in the auditory data may indicate that the user is inside a vehicle.

The motion evaluation service may store one or multiple types of threshold values pertaining to one or multiple types of data. Based on a comparison between the threshold value and the obtained data, the motion evaluation system determines whether the user in a vehicle.

According to an exemplary embodiment, the message blocking service includes a message evaluation service. The message evaluation service may be implemented at the user-side. According to an exemplary embodiment, the message evaluation service determines whether the user is a driver of a vehicle, as described herein. According to an exemplary embodiment, the message evaluation service evaluates the input characteristics pertaining to the user during an evaluation time window, examples of which are described below.

According to an exemplary embodiment, the message evaluation service includes an evaluation of input characteristics pertaining to the user and the authorship of a message. For example, the input characteristics include a speed at which the user inputs a letter, a portion of a word, a word, a portion of a sentence, a sentence, etc. Additionally or alternatively, the message evaluation service tracks the duration of pauses and the duration of active input during a time window within which the user authors the message. Other types of input characteristics may be evaluated, such as the length of the message (e.g., total number of letters, words, sentences, etc.), a total time to author the message, a length of time to begin to author the message starting from the instance that the user is notified of an incoming message (also referred to as a "response time"), the response time relative to a person associated with the incoming message (e.g., a friend of a best friend of the user, a relative of the user (e.g., brother, mother, sister, father, etc.), etc.), a time period from opening a communication application (e.g., an SMS application, an MMS application, etc.) and receiving a next input after the communication application is open, etc.

According to an exemplary embodiment, the message evaluation service identifies the application or service being used by the user via which the message is created. For example, the message evaluation service identifies whether an SMS application, an MMS application, an e-mail application, an 1M application, or a web browser is currently being used by the user that enables the user to author a message.

According to an exemplary embodiment, the message evaluation service generates and stores a template input signature based on the input characteristics. According to an exemplary embodiment, the template input signature is generated based on historical data. According to an exemplary implementation, the historical data may be obtained when the user is not in motion or not in a vehicle. By way of further example, the historical data may be obtained when the user is at home, at work, at a restaurant, or at some other locale that would necessarily eliminate the possibility that the user is in a vehicle, much less driving the vehicle. Additionally, for example, the historical data may be obtained when the user is in motion (e.g., walking, etc.), but not considered in a vehicle. In this way, even a user that may be quite adept at authoring a message while driving, such a user may not be able to satisfy the requirements of the template input signature that has been generated when the user is, for example, stationary or not in a vehicle. Indeed, it is not uncommon for the user to use only one hand when driving to navigate and input a message into the user device versus use two hands when the user is not driving. The message evaluation service may continually update the template input signature based on the user's input characteristics pertaining to messages authored by the user via the user device and other input characteristics occurring during the user's use of the user device, as described herein.

According to another exemplary embodiment, the message evaluation service may use a template input signature that is pre-configured. For example, the template input signature may be representative of an "average" user. The template input signature may be updated based on the input characteristics obtained during the user's use of the user device.

According to an exemplary embodiment, when the motion evaluation service determines that the user is in a vehicle, the message evaluation service uses the template input signature to determine whether the user is driving the vehicle. For example, when the user receives an incoming message, opens a communication application, begins to author a message (e.g., whether in response to receiving an incoming message or not), etc., the message evaluation service begins to obtain input characteristic data. The message evaluation service generates an input signature based on the input characteristic data. The motion evaluation service compares the input signature to the template input signature to determine whether the user is the driver of the vehicle. For example, when the input signature fails to meet the requirements of the template input signature, the message evaluation service determines that the user is the driver of the vehicle.

According to an exemplary embodiment, the message blocking service includes a blocking service. The blocking service may be implemented at the user-side, the network-side, or a combination thereof. According to an exemplary embodiment, the blocking service blocks messages to and from the user device. According to an exemplary embodiment, the blocking service blocks a message when the motion evaluation service determines that the user is in a vehicle and the message evaluation service determines that the user is the driver of the vehicle.

According to an exemplary embodiment, the blocking service changes the state of the user device. According to an exemplary implementation, the change of state of the user device includes blocking a message notification attributed to an incoming message received by the user device. For example, the blocking service may alter a notification setting of the user device to prevent auditory, tactile, and/or visual notifications to the user resulting from the receipt of the message by the user device. Additionally, the change of state of the user device includes preventing the user of the user device from authoring a message. Depending on whether an application that allows the user to create a message is currently running or not, the blocking service prevents the user from further using the currently running application and/or opening an application that is not currently running on the user device. For example, the blocking service disables an application or causes a force shutdown of an application, as described herein.

According to an exemplary embodiment, the blocking service provides a notification to the user that indicates that the blocking service has been activated on the user device. For example, the blocking service may cause a graphical user interface, which indicates that message blocking has been activated on the user device, to be displayed via a display of the user device.

According to another exemplary embodiment, the blocking service notifies a network device that the user is driving a vehicle. According to an exemplary implementation, the blocking service generates and transmits a message to a network device. The message includes data that indicates to suspend delivery of any incoming messages. The message may also include one or multiple types of identifiers. For example, the message may include an identifier of the user device (e.g., a Mobile Equipment Identifier (MEID), an International Mobile Equipment Identity (IMEI), an Electronic Serial Number (ESN), etc.) and/or a network address pertaining to the user device (e.g., a Media Access Control (MAC) address, an Internet Protocol (IP) address, an e-mail address, a telephone number, a Mobile Station International Subscriber Directory Number (MSISDN), etc.). The message may also include an identifier of the user (e.g., an International Mobile Subscriber Identity (IMSI), etc.).

According an exemplary embodiment, the blocking service transmits the message to a network device that provides a communication service, such as SMS, MMS, etc. In this regard, the blocking service of the user device may communicate to, for example, an SMS Center (SMSC) device, an MMS Center (MMSC) device, etc., and the SMSC device, the MMSC device, etc., may suspend delivery of subsequent incoming messages to the user device based on receipt of the message transmitted by the blocking service.

According to another exemplary embodiment, the blocking service transmits the message to a blocking platform device that provides a blocking service. In response to receiving the message from the user device, the blocking platform device communicates to the network device that provide a communication service, as described above, to suspend delivery of incoming messages to the user device.

According to an exemplary embodiment, the network device does not suspend delivery of an emergency message destined to the user device when the message blocking service is activated. For example, the emergency message may be an Emergency Broadcast System (EBS) message, an America's Missing Broadcast Emergency Response (AMBER) alert, a message from an emergency service entity, etc.

According to an exemplary embodiment, the blocking service allows the user to override the blocking service when the blocking service is activated. For example, the blocking service allows the user to create and transmit a message when the message is an "emergency" message. An example of an emergency message includes a message to an emergency service entity (e.g., 911, etc.).

According to an exemplary embodiment, when the user device determines that the user is no longer the driver of the vehicle, the blocking service deactivates the blocking service. For example, the blocking service may revert to the previous state of the user device and reset the notification setting of the user device to allow auditory, tactile, and/or visual notifications to the user regarding incoming messages. The blocking service may provide a notification to the user that indicates that message blocking has been deactivated.

According to another exemplary embodiment, when the user device determines that the user is no longer the driver of the vehicle and the blocking service has been implemented at the network side, the blocking service will generate and transmit a message to the network device or the blocking platform device indicating that the message blocking has been deactivated.

FIG. 1A is a diagram illustrating an exemplary environment 100 in which an exemplary embodiment of a message blocking service may be implemented. As illustrated, environment 100 includes a network 105. Network 105 includes a network device 110 and network devices 115-1 through 115-X, in which X>1 (also may be referred to collectively as network devices 115 and, individually and/or generically as network device 115). Additionally, environment 100 includes user devices 130-1 and 130-2 (also may be referred to collectively as user devices 130 and, individually and/or generically as user device 130) operated by users 135-1 and 135-2 (also may be referred to collectively as users 135 and, individually and/or generically as user 135), respectively. User 135-2 and user device 130-2 are in a vehicle 140.

Environment 100 may be implemented to include wireless connections among the devices and the network illustrated. Alternatively, environment 100 may be implemented to include wireless connections in combination with wired and/or optical connections among the devices and the network illustrated. A connection may be direct or indirect and may involve an intermediary device and/or an intermediary network not illustrated in FIG. 1A. Additionally, the number, type (e.g., wired, wireless, etc.), and the arrangement of connections between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1A. For example, the message blocking service described herein may be implemented solely at the user side (e.g., user device 130). In this regard, according to other embodiments, the blocking service described in relation to network device 110 and the suspension of delivering incoming messages, by network devices 115, is purely optional. Additionally, or alternatively, environment 100 may include an additional network and/or arrangement of networks that is different from that illustrated in FIG. 1A. Also, according to other embodiments, one or more functions and/or processes described as being performed by a particular device may be performed by a different device, or some combination of devices.

Network 105 may include one or multiple networks of one or multiple types. For example, network 105 includes a wireless network. The wireless network may be implemented as a terrestrial network, a satellite network, or a combination thereof. Alternatively, network 105 may include a wireless network in combination with a wired and/or an optical network. According to an exemplary embodiment, network 105 includes a cellular network. For example, the cellular network may be implemented as a Long Term Evolution (LTE) network, an LTE Advanced network, a Universal Mobile Telecommunications system (UMTS) network, a Global System for Mobile Communications (GSM) network, a CDMA network (e.g., CDMA One, CDMA2000, Wideband CDMA (WCDMA)), an Ultra Mobile Broadband (UMB) network, a High-Speed Packet Access (HSPA) network, an Evolution Data Optimized (EV-DO) network, and/or another type of network. Network 105 may include various other types of networks, such as for example, the Internet, a private network, a core network, a packet-switched network, an Internet Protocol Multimedia Subsystem (IMS) network, a cloud network, a data network, etc. Network 105 provides access to network device 110 and network devices 115.

Although not illustrated, network 105 may include other network devices that pertain to various network-related aspects, such as access control, routing, billing, security, network policies, etc., which have been omitted for the sake of brevity.

Network device 110 includes a communicative and computational device. For example, network device 110 may be implemented as a computer. Network device 110 may also include a mass storage device. For example, the mass storage device may store data pertaining to a blocking service.

Figure 1B:
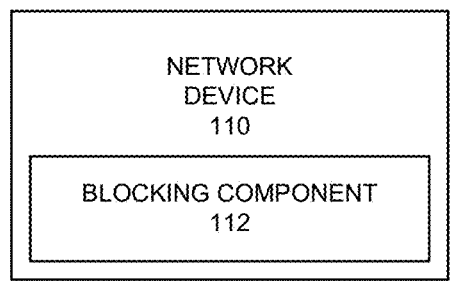
FIG. 1B is a diagram illustrating an exemplary functional component of a network device.

Referring to FIG. 1B, according to an exemplary embodiment, network device 110 includes a blocking component 112 that provides a blocking service, as described herein. Blocking component 112 may be implemented as software, which when executed, provides the blocking service. For example, the software may include a server relative to user device 130 and a client relative to network devices 115. Blocking component 112 is described further below.

Each of network devices 115 includes a communication device that provides a communication service. For example, network device 110 may be implemented as an e-mail server device, an SMS center (SMSC) device, MMS Center (MMSC) device, an IM server device, an EMS server device, a web server device, etc.).

Each of user devices 130 includes a communication device. For example, user device 130 includes a mobile device and/or a portable device that provides a communication service. The communication service includes permitting user 135 to transmit and receive messages. By way of further example, user device 130 may be implemented as a smartphone, a personal digital assistant (PDA), a computer (e.g., a laptop, a palmtop, etc.), a cellular mobile phone, a tablet, a netbook, or a wearable device (e.g., a watch, etc.).

Figure 1C:
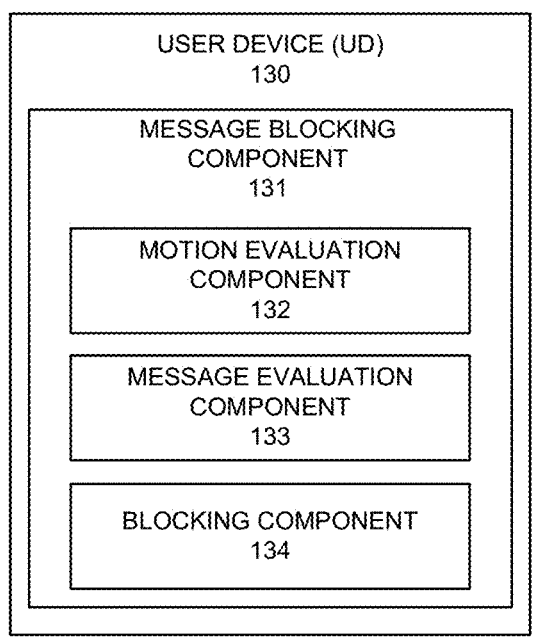
FIG. 1C is a diagram illustrating exemplary functional components of a user device.

According to an exemplary embodiment, user device 130 includes a message blocking component 131 that provides a message blocking service, as described herein. For example, referring to FIG. 1C, according to an exemplary embodiment, message blocking component 131 includes a motion evaluation component 132 that provides a motion evaluation service, a message evaluation component 133 that provides a message evaluation service, and a blocking component 134 that provides a blocking service.

Message blocking component 131 may be implemented as software, which when executed, provides the message blocking service. For example, the software may operate as a client or a daemon application that executes upon boot-up of user device 130. The software may operate at the application level and/or at the system level (e.g., operating system level). The software may be implemented as a plug-in. For example, the software may include a plug-in to an SMS application or another type of communication application (e.g., MMS, etc.). Additionally, or alternatively, the software may be implemented as a standalone. The software may be written in one or more programming languages, such as C++, Java, Java 2 Platform Micro Edition (J2ME), Ruby, C, etc. The software may communicate with other programs, applications, services, etc., operating on user device 130 based on inter-process communication (IPC), application programming interface (API) calls, callback functions, etc. Message blocking component 131 may provide a graphical user interface to the user pertaining to the message blocking service.

According to an exemplary embodiment, the message blocking service may be a service that is continually running on user device 130. In this way, referring to FIG. 1A, whether the user (e.g., user 135-1) is not in a vehicle or the user (e.g., user 135-2) is in a vehicle (e.g., vehicle 140), the message blocking service may determine whether to activate message blocking (e.g., block inbound messages to and outbound messages from user device 130).

According to another exemplary embodiment, the message blocking service may be a service that is not continually running on user device 130. For example, the message blocking service may be activated in response to various trigger events. By way of further example, the trigger event may be when user 135 enters text via an input component (e.g., a keypad, etc.), when user 135 opens an application (e.g., an SMS application, an MMS application, an e-mail application, etc.), when the message blocking service determines that user 135 is in vehicle 140 (e.g., an accelerometer detects a threshold value of acceleration, etc.), when the message blocking service determines that user 135 is in vehicle 140 and an application (e.g., an SMS application, etc.) is open, when an incoming message is received at user device 130, etc. A further description of message blocking component 131 is provided below. Vehicle 140 may include a car, a truck, or some other type of vehicle, as previously described.

Figure 2A:
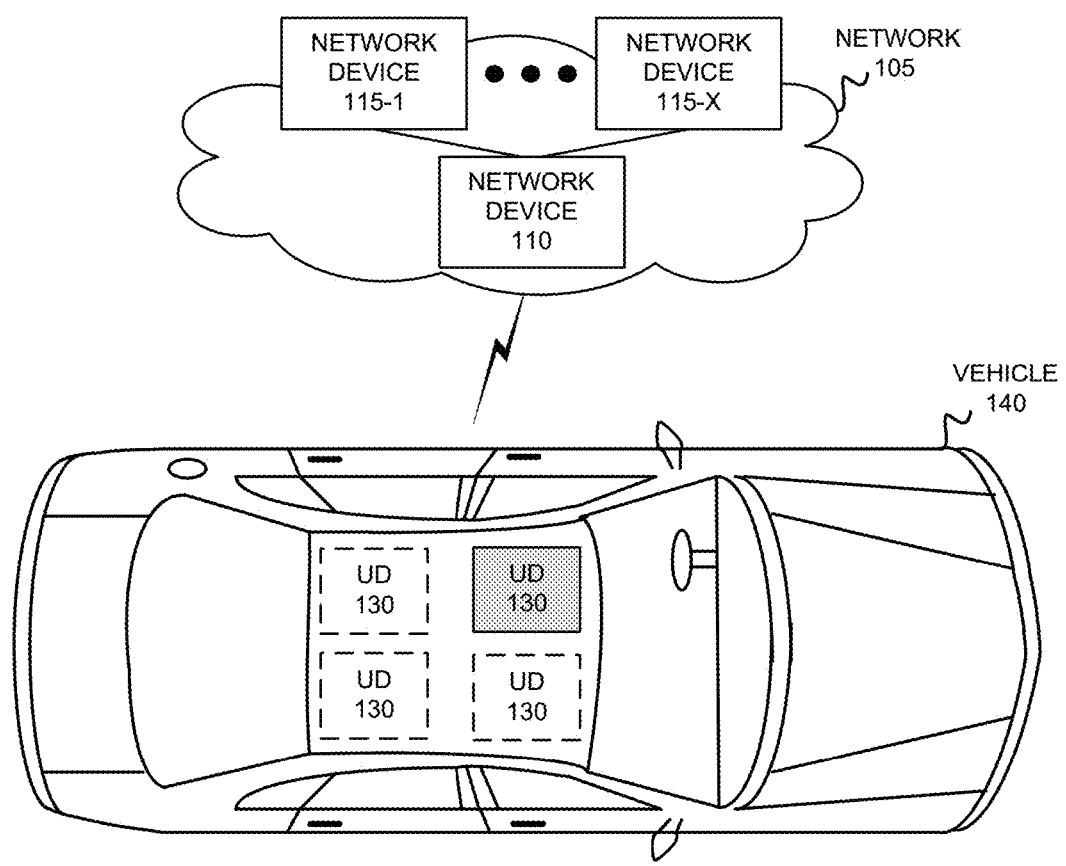
FIGS. 2A-2E are diagrams illustrating an exemplary embodiment of the message blocker service in relation to an exemplary scenario.

FIGS. 2A-2E are diagrams illustrating an exemplary embodiment of the message blocker service in relation to an exemplary scenario. Referring to FIG. 1A and FIG. 2A, assume a scenario in which the user is in a vehicle, such as depicted in FIG. 1A in relation to user 135-2, user device 130, and vehicle 140 (e.g., a car). Since user 135 may be a driver of vehicle 140 or a passenger of vehicle 140 in which user device 130 may be located in various positions within vehicle 140, as illustrated in FIG. 2A, according to this scenario, assume user 135 is the driver (as illustrated by the highlighting of user device 130). Also assume, according to this scenario, that message evaluation component 133 has generated and stored a template input signature.

Figure 2B:
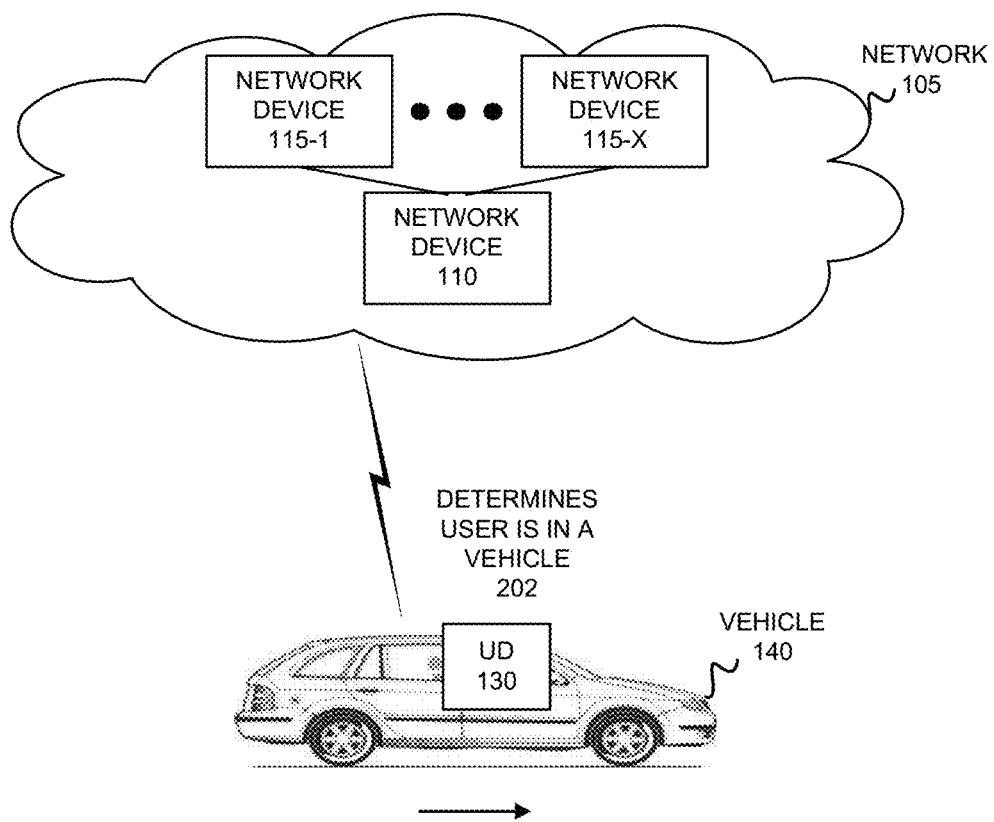

Referring to FIG. 2B, assume user 135 enters vehicle 140 and begins to drive. While user 135 is driving, motion evaluation component 132 obtains data from one or multiple sources. For example, as previously described, motion evaluation component 132 may obtain data from an accelerometer and/or a GPS receiver, as well as other types of sensors or devices (e.g., a gyroscope, a compass, a light sensor, a microphone, etc.). Motion evaluation component 132 may process the obtained data (e.g., location data, acceleration data) to obtain other types of data (e.g., speed, velocity) based on well-known calculations. Motion evaluation component 132 may include a digital signal processing (DSP) system to perform a spectral analysis of the auditory data and/or sound detection and identification logic, which detects and identifies from the auditory data, particular sounds commonly present when in a vehicle. For example, the sound detection and identification logic may compare waveforms to known template waveforms that are representative of the particular sounds (e.g., the sound of an engine, brakes applied, vehicle doors opening and closing, etc.), as previously described.

According to an exemplary embodiment, motion evaluation component 132 compares a value of the obtained data to a threshold value. According to an exemplary implementation, motion evaluation component 132 stores a data structure or database that includes threshold values pertaining to certain types of data. For example, referring to FIG. 4A, motion evaluation component 132 may store an exemplary motion evaluation table 400. As illustrated, table 400 includes an acceleration field 405, a velocity field 410, and a speed field 415. According to an exemplary implementation, the threshold values discussed may be pre-configured and used to indicate that a user is in a vehicle. By way of example, acceleration field 405 stores a threshold value pertaining to acceleration; velocity field 410 stores a threshold value pertaining to velocity; and speed field 415 stores a threshold value pertaining to speed.

According to an exemplary implementation, motion evaluation component 132 determines the acceleration pertaining to user device 130 based on data obtained from an accelerometer. Additionally, or alternatively, motion evaluation component 132 calculates the velocity and/or the speed pertaining to user device 130 based on the acceleration data and well-known equations. Motion evaluation component 132 compares the acceleration data, the velocity data, and/or the speed data to the threshold value(s) included in table 400 to determine whether user 135 of user device 130 is in a vehicle.

According to another exemplary implementation, motion evaluation component 132 determines the acceleration, velocity, and/or the speed pertaining to user device 130 based on location data. For example, motion evaluation component 132 calculates a distance between two or more locations over time to derive acceleration data, velocity data, and/or speed data. In a manner similar to that described, motion evaluation component 132 compares the acceleration data, the velocity data, and/or the speed data to the threshold value(s) included in table 400 to determine whether user 135 of user device 130 is in a vehicle.

According to other implementations, table 400 may include additional fields, different fields, and/or fewer fields than those illustrated and described herein. For example, table 400 may include a start-stop field. The start-stop field stores a threshold hold value that indicates a minimum time that user 135/user device 130 remains stationary before motion evaluation component 132 may determine that user 135 is no longer in a vehicle, or that user 135 has ceased driving the vehicle, such as when the vehicle is parked. As described further below, when a user is in a vehicle, the user may start and stop due to traffic conditions, traffic lights, etc. According to an exemplary implementation, motion evaluation component 132 may use start-stop data as a basis for determining whether the user is still in a vehicle. Additionally, or alternatively, motion evaluation component 132 may use position data in conjunction with map data to determine whether the user is on a road, at a traffic light, in a building, etc.

Figure 2C:
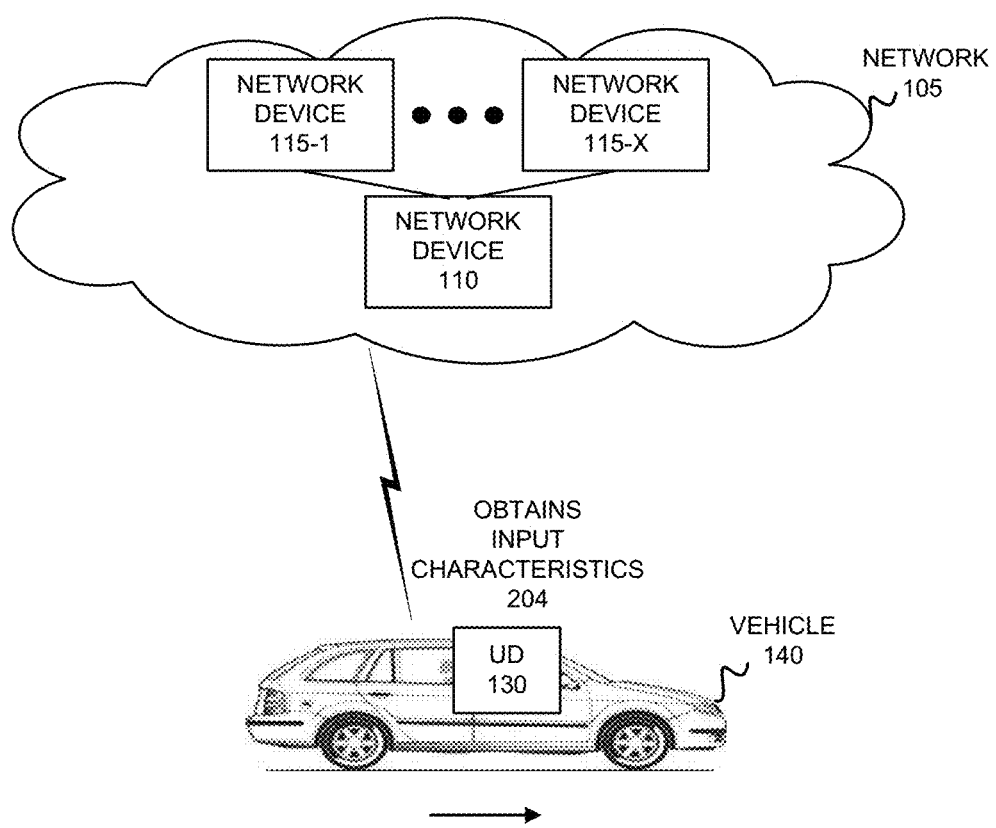

Referring back to FIG. 2B, according to this scenario, assume that motion evaluation component 132 determines that user 135 of user device 130 is in a vehicle (illustrated in FIG. 2B as determines user is in vehicle 202). As user 135 is driving vehicle 140, user 135 receives an SMS message from a best friend. Referring to FIG. 2C, user 135 hears a notification indicating that user device 130 received a message. User 135 interacts with user device 130 and navigates to a user interface to read the SMS message. Subsequently, user 135 begins to author a reply SMS message to the best friend. During this time, message evaluation component 133 collects input characteristics. For example, message evaluation component 133 begins to obtain the input characteristics from the time the SMS message from the best friend is received at user device 130 (illustrated in FIG. 2C as obtains input characteristics 204).

Figure 2D:
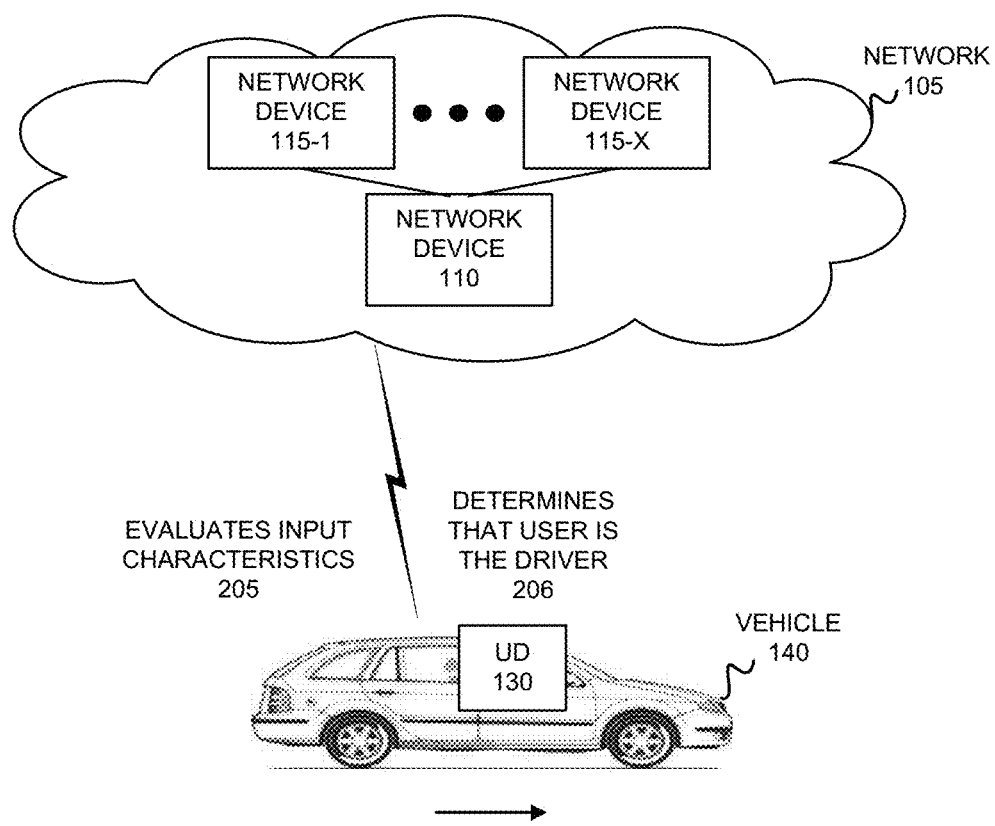

Referring to FIG. 2D, as message evaluation component 133 obtains the input characteristics, message evaluation component 133 also evaluates the input characteristics (illustrated in FIG. 2D as evaluates input characteristics 205). For example, as previously described, message evaluation component 133 may obtain data pertaining to the speed characteristics of authoring a message, data pertaining to the duration of active input, data pertaining to pauses, data pertaining to the length of the message, time-related data (e.g., time to author the message, response time, navigation characteristics, etc.).

According to an exemplary embodiment, as previously described, message evaluation component 133 generates an input signature based on the values of the input characteristics. For example, message evaluation component 133 analyzes the obtained data to calculate various speed characteristics, etc., as described herein. Message evaluation component 133 compares the input signature to the template input signature. According to an exemplary implementation, message evaluation component 133 stores a data structure or database that includes threshold values pertaining to certain types of data. For example, referring to FIG. 4B, message evaluation component 133 may store an exemplary message evaluation table 430. As illustrated, table 430 includes a speed field 435, an active field 440, a pause field 445, a response time field 450, a recipient field 455, and a navigation field 460.

According to an exemplary implementation, each field of table 430 stores data indicating a particular characteristic of the template input signature, which was generated based on historical data. According to an exemplary implementation, message evaluation component 133 averages the historical data to generate a threshold value for a particular type of characteristic, such as calculating the arithmetic mean, the median, or the mode (e.g., value that occurs most frequently), etc. According to other exemplary implementations, message evaluation component 133 may use other well known methods. According to one exemplary implementation, the threshold value may be a single value. According to another exemplary implementation, the threshold value may be a range values (e.g., between x and y).

Referring to FIG. 4B, speed field 435 stores speed data indicating a speed metric pertaining to the user's authorship of a message. By way of example, the speed data may indicate a speed at which the user inputs a letter, a portion of a word, a word, a portion of a sentence, a sentence, etc. Active field 440 stores data indicating an active input value relative to a time window within which the user authors the message. For example, when the total time to author the message is 20 seconds, and the user inputted the message within 15 seconds, the value 15 may indicate the active input value. According to an exemplary implementation, message evaluation component 133 may, for example, average the active input values among multiple messages to yield an active input value or percentage value, which is stored in active field 440. Pause field 445 stores data indicating an inactive input value (or pause value) relative to a time window within which the user authors the message. For example, using the same example mentioned directly above, the value 5 may indicate the inactive input value. Message evaluation component 133 may, for example, average active inputs among multiple messages to yield an inactive input value or percentage value, which is stored in pause field 445.

Response time field 450 stores data indicating a time period within which the user responds to an incoming message of which the user is notified. Recipient field 455 stores data indicating the recipient of a message. According to an exemplary implementation, response time field 450 and recipient field 455 may include multiple mappings. For example, one mapping may pertain to a response time value, as stored in response time field 450, when the message is directed to the user's best friend, which is mapped to the data indicating the user's best friend, as stored in recipient field 455. According to another example, another mapping may pertain to a response time value, as stored in response time field 450, when the message is directed to the user's parent, which is mapped to the data indicating the user's parent, as stored in recipient field 455.

According to an exemplary implementation, message evaluation component 133 obtains relationship information regarding recipients of messages from a contact list stored at user device 130. Additionally, message evaluation component 133 may infer a relationship (e.g., best friend, friend, etc.) based on a frequency of communications between user 135 and the recipient. Additionally, or alternatively, message evaluation component 133 may obtain relationship information regarding recipients based on well-known techniques.

Navigation field 460 stores data indicating other input characteristics, such as navigational characteristics relative to the user's use of the communication application (e.g., an SMS application, etc.), navigational characteristics relative to opening the communication application, etc. For example, navigation field 460 may store data indicating a time period from opening a communication application (e.g., an SMS application, an MMS application, etc.) and receiving a next input after the communication application is open, and may store a time period from the communication application being opened and selecting the recipient, etc. In this regard, navigation field 460 may store various navigational and input characteristics associated the user.

According to other implementations, table 430 may include additional fields, different fields, and/or fewer fields than those illustrated and described herein. For example, table 430 may include an application field. The application field stores data indicating the name of the application used by the user to author a message. According to an exemplary implementation, the data stored in the application field may be used by the blocking service for identifying applications to block from further use.

Depending on the input characteristics received from the onset of the evaluation window, message evaluation component 133 may determine that user 135 is the driver of vehicle 140 before or after user 135 begins or completes the reply SMS message. However, according to this example, assume that during the authoring of the reply SMS message, message evaluation component 133 determines that user 135 is the driver of vehicle 140. Additionally, according to an exemplary embodiment, motion evaluation component 132 continues to determine whether user 135 is in or is operating vehicle 140. Since user device 130 associated with user 135 (e.g., whether a passenger or a driver) may undergo various changes in acceleration, speed, velocity, position, etc., while being transported in vehicle 140, motion evaluation component 132 includes logic to account for these changes. For example, while user 135/user device 130 is in vehicle 140, vehicle 140 may stop at an intersection due to a stop sign or a traffic light. Alternatively, while user 135/user device 130 is in vehicle 140, traffic conditions (e.g., in a traffic jam, etc.) may cause user 135 to stop and start vehicle 140. According to an exemplary implementation, the motion evaluation component 132 uses a threshold value (e.g., start-stop data) as a basis to determine whether user 135/user device 130 is no longer being transported. For example, motion evaluation component 132 may require that user 135/user device 130 remain stationary for a minimal time period. Additionally, or alternatively, motion evaluation component 132 may evaluate other values pertaining to other types of data obtained (e.g., position data, sensor data, map data, etc.) to make such a determination.

Referring back to FIG. 2D, message evaluation component 133 determines that user 135 is the driver of vehicle 140 based on a comparison of the input signature generated and the template input signature stored in table 430 (illustrated in FIG. 2D as determines that use is the driver 206). As previously described, the blocking service may be implemented at the user-side, the network-side, or both. A further description of the blocking service is provided below.

Figure 2E:
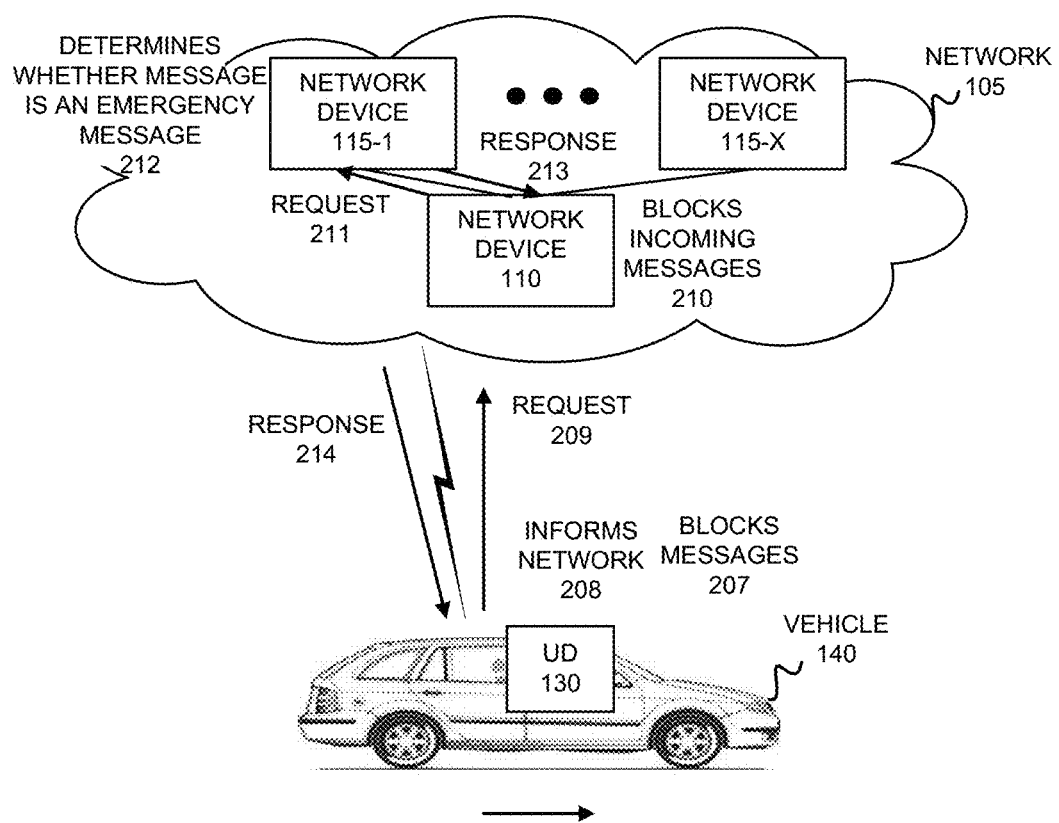

According to an exemplary embodiment, in response to determining that the user 135 is the driver of vehicle 140 by message evaluation component 133, blocking component 134 blocks inbound messages to and/or outbound messages from user device 130 (illustrated in FIG. 2E as blocks messages 207). According to an exemplary embodiment, blocking component 134 selects which applications to disable. According to an exemplary implementation, blocking component 134 uses data collected from message evaluation component 133 to identify software (e.g., applications, programs, etc.) that allow user 135 to author a message. Depending on the configuration of user device 130 (e.g., operating system (OS), application, etc.), blocking component 134 disables the communication application. By way of example, blocking component 134 invokes a command (e.g., to an application manager) on user device 130 to prevent user 135 being able to open a communication application. According to other examples, blocking component 134 may use well-known techniques in view of the configuration of user device 130. In the event that the application is currently running, according to an exemplary embodiment, blocking component 134 causes a force shutdown of the communication application. For example, blocking component 134 invokes a command (e.g., to a running applications manager) on user device 130 to cause a force shutdown of a communication application. Blocking component 134 may further prevent user 135 from re-enabling any communication application disabled or subject to a force shutdown. In view of these procedures, user 135 may no longer create and transmit an outbound message at user device 130.

According to another exemplary embodiment, blocking component 134 alters a notification setting at user device 130 to prevent auditory, tactile, and/or visual notifications to user 135 resulting from the receipt of the message by user device 130.

When user device 130 is in a blocked state, according to an exemplary embodiment, blocking component 134 causes a graphical user interface, which indicates that message blocking has been activated on the user device, to be displayed. Additionally, when user device 130 is in a blocked state, according to an exemplary embodiment, blocking component 134 allows user 135 to override the blocking service when the blocking service is activated. For example, blocking component 134 allows user 135 to create and transmit a message when the message is an "emergency" message. An example of an emergency message includes a message to an emergency service entity (e.g., 911, etc.). By way of example, blocking component 134 may provide a graphical user interface that allows user 135 to indicate that user 135 wishes to override the blocking service. Blocking component 134 may monitor the input of user 135 when authoring the message to ensure that user 135 is authoring an emergency message. In the event user 135 attempts to author a message other than an emergency message, blocking component 134 will force shutdown the communication application. Additionally, according to an exemplary implementation, blocking component 134 may require user 135 to stop vehicle 140, which may be verified by motion evaluation component 132.

As previously described, according to yet another exemplary embodiment, blocking component 134 notifies a network device that user 135 is driving vehicle 140. According to an exemplary implementation, blocking component 134 notifies network device 110. As previously described, blocking component 134 generates and transmits a message (e.g., illustrated as request 209 in FIG. 2E) that includes data to suspend delivery of an incoming message. The message may also carry data indicating one or multiple identifiers. In a manner similar to that previously described, blocking component 134 may select one or multiple communication applications to block. Accordingly, request 209 may carry data pertaining to one or multiple communication applications, various identifiers (e.g., an SMS address, an MMS address, an e-mail address, etc.), etc., so that incoming messages from various communication platforms may be blocked.

In response to receiving request 209, blocking component 112 of network device 110 invokes a blocking service (illustrated in FIG. 2E as blocks incoming messages 210). For example, blocking component 112 selects network device(s) 115 with which to communicate, based on the data carried in request 209. Blocking component 112 generates and transmits a message (e.g., a request 211) to network device 115. Request 211 includes data indicating to suspend delivery of an incoming message to user device 130 and one or multiple identifiers previously described. In response, network device 115 blocks any incoming message destined to user device 130. According to an exemplary implementation, as previously described, network device 115 may not prevent an emergency message from being delivered to user device 130. For example, network device 115 may determine whether an incoming message is an emergency message based on a field (e.g., a "From" field, etc.) in the incoming message (e.g., illustrated in FIG. 2E as determines whether message is an emergency message 212).

Network device 115 generates and transmits a message (e.g., a response 213), which indicates that delivery of incoming messages to user device 130 has been suspended, to network device 110. Blocking component 112 receives response 213 and, in response, generates and transmits a message (e.g., response 214), which indicates that delivery of incoming messages to user device 130 has been suspended, to user device 130.

In a manner similar to that previously described, blocking component 112 of network device 110 and network device 115 deactivates the blocking service in response to receiving a message (e.g., from user device 130). For example, when message blocking component 131 of user device 130 determines that user 135 is no longer the driver of vehicle 140, blocking component 134 generates and transmits a message, which indicates to resume delivery of incoming messages to user device 130, along with identifiers, to network device 110. In response, blocking component 112 of network device 110 selects and communicates to network device(s) 115 to cause the deactivation of the blocking service. User device 130 may receive a message (e.g., a response) from network device 110 when the deactivation is completed.

According to another exemplary embodiment, the network-side blocking service may be provided without network device 110. For example, as previously described, blocking component 134 may generate and transmit a message to network device 115, instead of network device 110, to request the suspension of delivering incoming messages to user device 130. Similarly, user device 130 may generate and transmit a message to network device 115 to resume the delivery of incoming messages to user device based on a determination that user 135 is no longer a driver of vehicle 140.

Figure 2F:
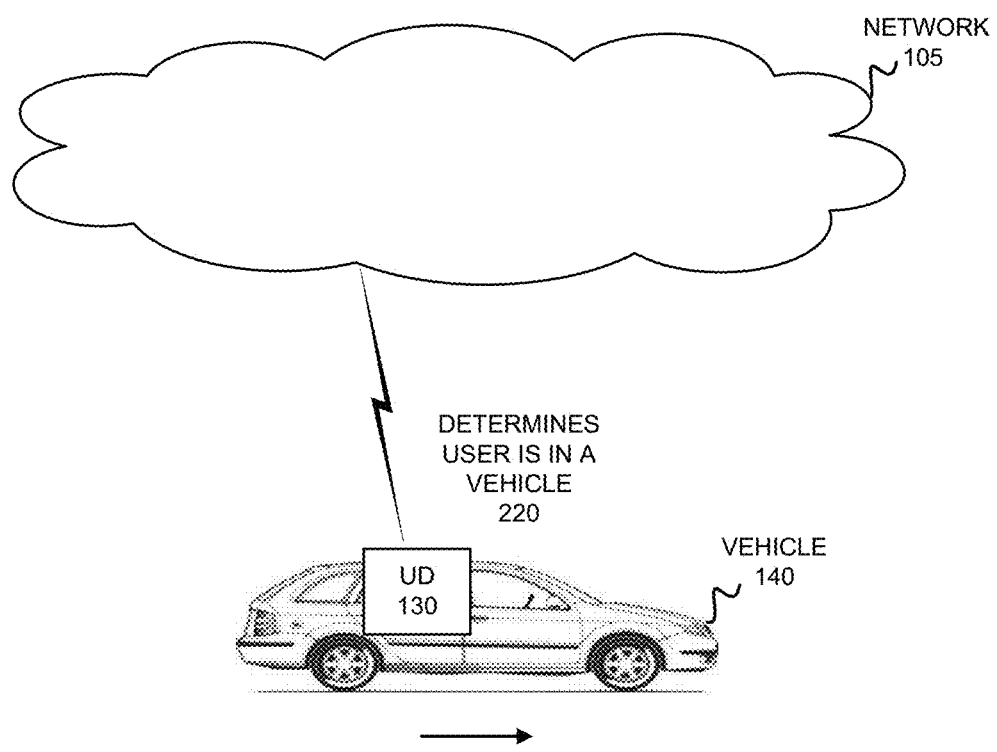
FIGS. 2F-2H are diagrams illustrating an exemplary embodiment of the message blocker service in relation to another exemplary scenario.
Figure 2G:
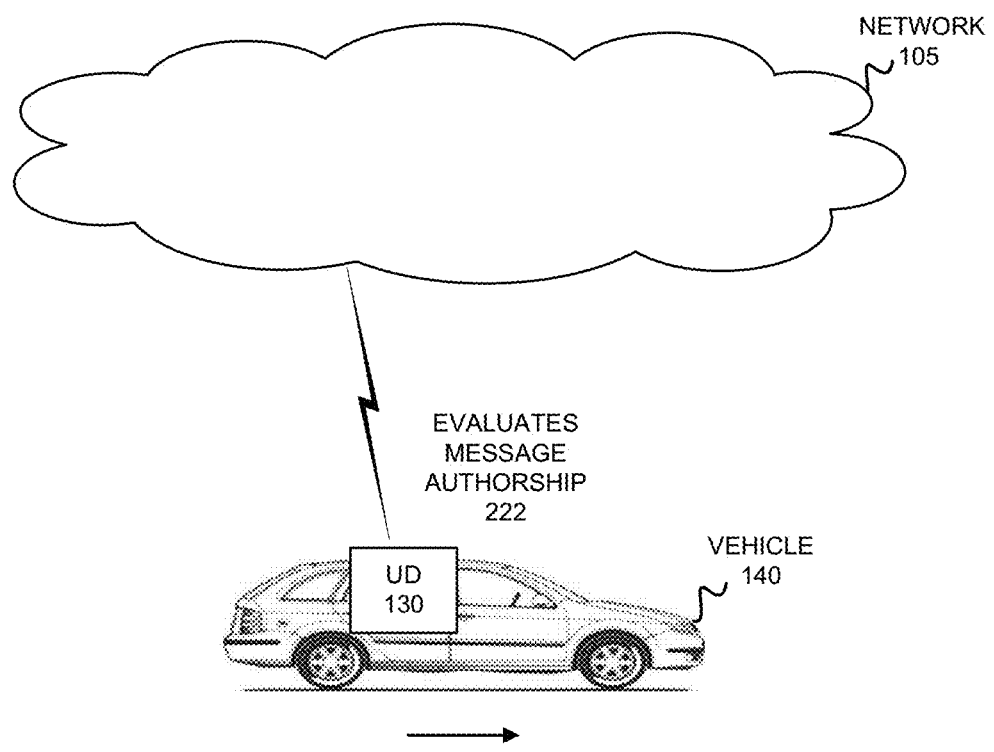
Figure 2H:
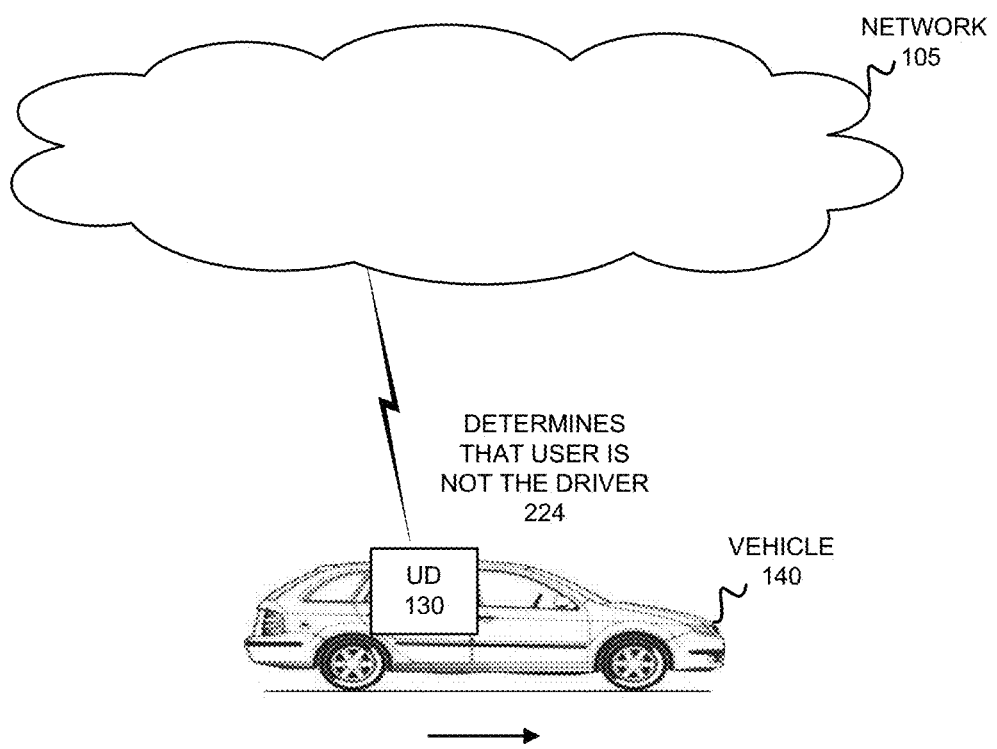

FIGS. 2F-2H are diagrams illustrating an exemplary embodiment of the message blocker service in relation to another exemplary scenario. Referring to FIGS. 2A and 2F, assume for this scenario that user 135 is a passenger in vehicle 140. In a manner similar to that previously described, motion evaluation component 132 determines that user 135/user device 130 is in a vehicle (e.g., vehicle 140) (illustrated in FIG. 2F as determines user is in a vehicle 220). Since user 135 is not the driver, user 135 begins to author an SMS to a friend to inform the friend that user 135 is on the way. Referring to FIGS. 2G and 2H, message evaluation component 133 evaluates the input characteristics of user 135 (illustrated in FIG. 2G as evaluates message authorship 222), and based on a comparison with the template input signature of table 430, determines that user 135 is not the driver of vehicle 140 (illustrated in FIG. 2H as determines that user is not the driver 224).

Figure 2I:
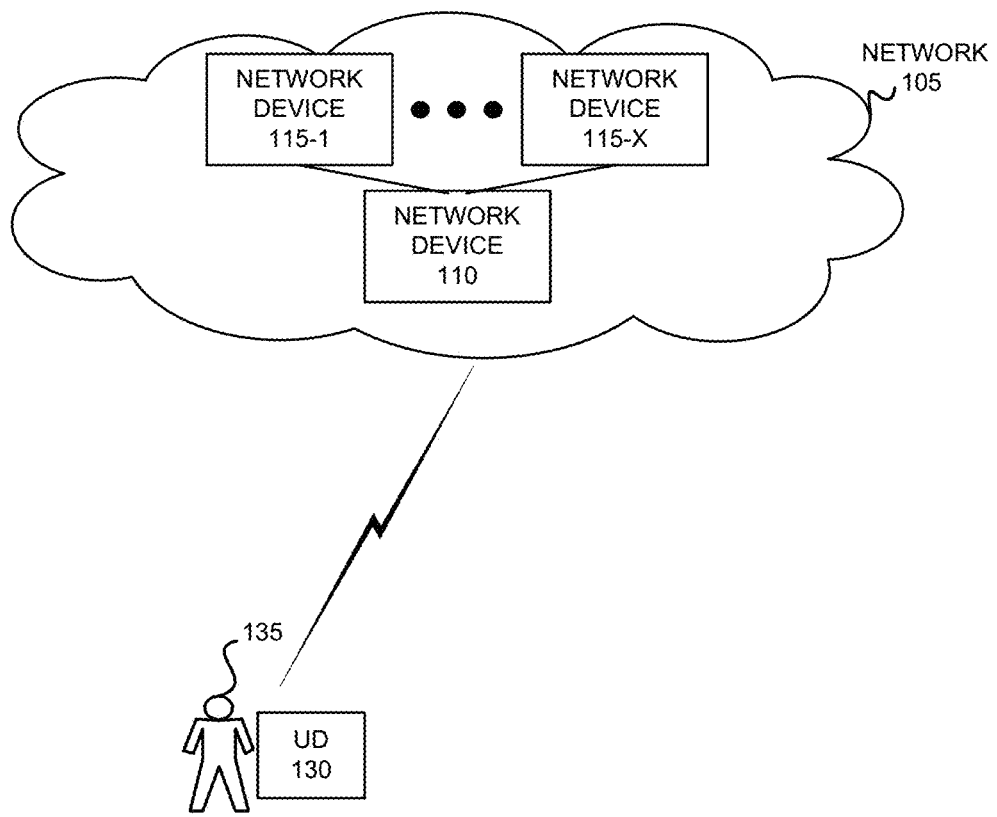
FIG. 2I is a diagram illustrating an exemplary embodiment of the message blocker service in relation to yet another exemplary scenario.

FIG. 2I is a diagram illustrating an exemplary embodiment of the message blocker service in relation to yet another exemplary scenario. According to this exemplary scenario, assume that user 135 is walking in the streets of a city. Motion evaluation component 132 determines that user 135 is not in a vehicle. Thereafter, user 135 begins to author an MMS message to a friend. Since motion evaluation component 132 has not determined that user 135 is in a vehicle, message evaluation component 133 collects historical data and updates the template input signature.

While exemplary scenarios have been described in relation to FIGS. 2A-2I, according to other scenarios, the message blocker service may operate in a manner different than that described depending on the circumstances surrounding user 135/user device 130.

Figure 3:
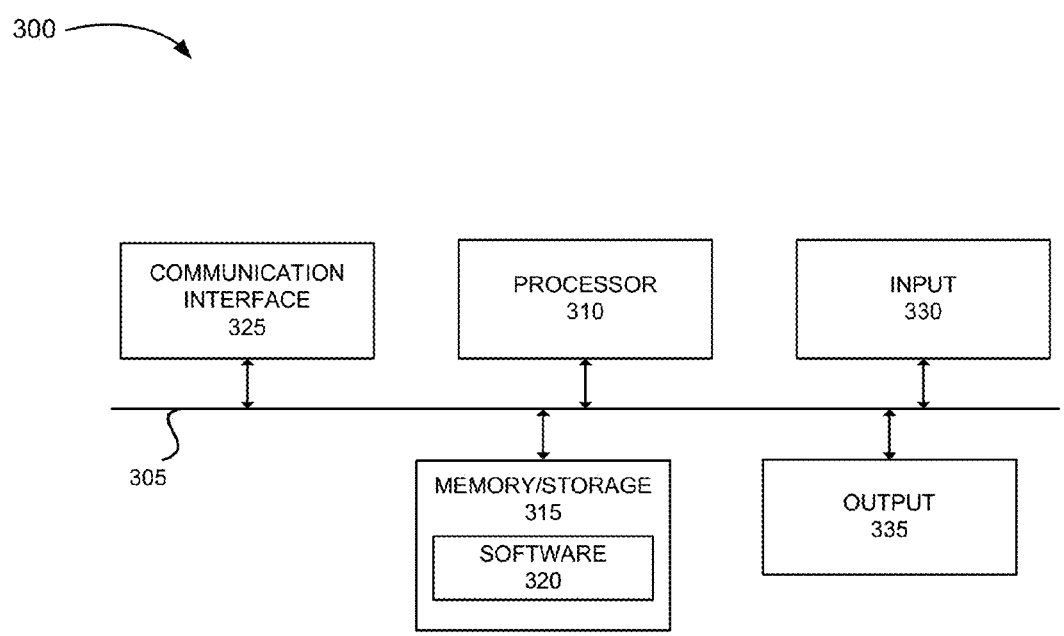
FIG. 3 is a diagram illustrating exemplary components of a device that may correspond to one or more of the devices illustrated in the exemplary environment of FIG. 1A.

FIG. 3 is a diagram illustrating exemplary components of a device 300 that may correspond to one or more of the devices in environment 100. For example, device 300 may correspond to network device 110, network device 115, and user device 130. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the elements of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.) and a corresponding drive. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to user device 130, according to an exemplary implementation, message blocking component 131 comprises software 320. Additionally, for example, with respect to network device 110, according to an exemplary implementation, blocking component 112 comprises software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. According to an exemplary implementation, communication interface 325 includes a GPS receiver. Communication interface 325 may include an antenna. Communication interface 325 may operate according to a protocol stack and a communication standard.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 5A:
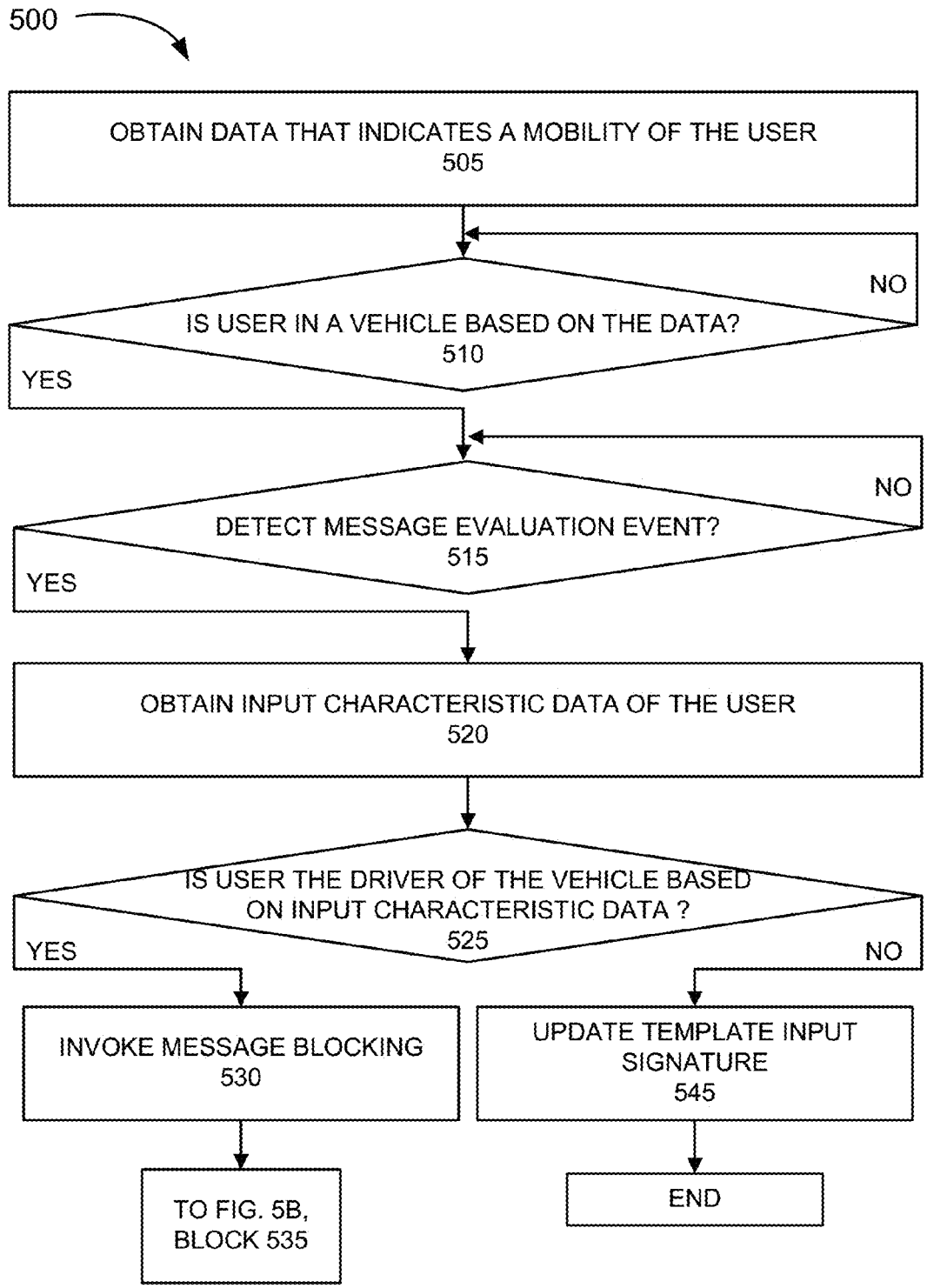
FIGS. 5A and 5B are flow diagrams that illustrate an exemplary process pertaining to the message blocker service.
Figure 5B:
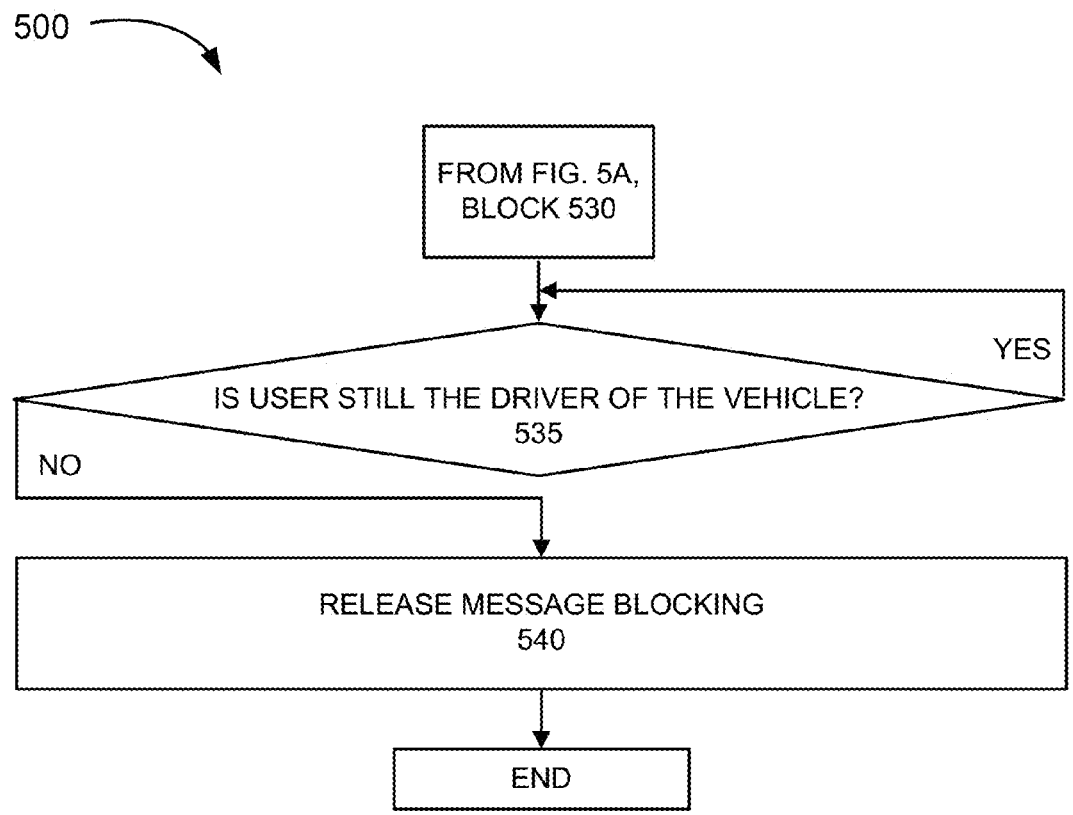

FIGS. 5A and 5B are flow diagrams illustrating an exemplary process 500 pertaining to the message blocker service. Process 500 is directed to a process previously described above with respect to FIGS. 2A-2I, as well as elsewhere in this description, in which a user-side message blocking service is provided. According to an exemplary embodiment, user device 130 performs steps of process 500. For example, processor 310 executes software 320 to perform the steps described.

Referring to FIG. 5A, block 505, process 500 may begin with obtaining data that indicates a mobility of the user. For example, as previously described, motion evaluation component 132 obtains data from one or multiple sources, such as acceleration data, location data, contextual data, etc. Motion evaluation component 132 may also calculate data (e.g., acceleration, velocity, etc.) and/or process contextual data (e.g., auditory data).

In block 510, it is determined whether the user is in a vehicle based on the data. For example, as previously described, motion evaluation component 132 compares the obtained data to threshold values stored in table 400. Additionally, motion evaluation component 132 may perform other comparisons (e.g., template waveforms, etc.).

When it is determined that the user is not in a vehicle (block 510—NO), process 500 may continue in this loop, as illustrated in FIG. 5A. For example, user device 130 may continue to evaluate motion data. Alternatively, according to another exemplary implementation, process 500 may end. According to yet another exemplary implementation, process 500 may continue to block 515. For example, user device 130 may wait for an opportunity to collect input characteristic data to use to update the template input signature.

When it is determined that the user is in a vehicle (block 510—YES), it is determined whether a message evaluation event is detected (block 515). For example, message evaluation component 133 may monitor for various events to occur, such as receiving a message at user device 130, the user opening a communication application, the user beginning to author a message (e.g., when a communication application is already opened before the user enters the vehicle), etc.

When it is determined that a message evaluation event is not detected (block 515—NO), process 500 may continue in this loop, as illustrated in FIG. 5A. For example, user device 130 waits for a message evaluation event to occur and to collect input characteristic data. Alternatively, according to another exemplary implementation, process 500 may end.

When it is determined that a message evaluation event is detected (block 515—YES), input characteristic data is obtained from the user (block 520). For example, as previously described, message evaluation component 133 obtains data pertaining to the speed characteristics of authoring a message, data pertaining to the duration of active input, data pertaining to pauses, data pertaining to the length of the message, time-related data (e.g., time to author the message, response time, navigation characteristics, etc.). Message evaluation component 133 generates an input signature based on the input characteristic data obtained.

In block 525, it is determined whether the user is the driver of the vehicle based on the input characteristic data. For example, as previously described, message evaluation component 133 compares an input signature to the template input signature stored in table 430.

When it is determined that the user is the driver of the vehicle (block 525—YES), message blocking is invoked (block 530). For example, as previously described, blocking component 134 blocks incoming messages to and/or outbound message from user device 130.

Referring to FIG. 5B, in block 535, it is determined whether the user is still the driver of the vehicle. For example, motion evaluation component 132 continues to monitor the mobility of the user (e.g., as illustrated in block 505).

When it is determined that the user is still the driver (block 535—YES), process 500 may continue in this loop, as illustrated in FIG. 5A. Additionally, for example, user device 130 may monitor the activity of the user. For example, user device 130 is responsive to the user's request to override the message blocking in case the user wishes to author an emergency message.

When it is determined that the user is not still the driver of the vehicle (block 535—NO), the message blocking is released (block 540). For example, as previously described, blocking component 134 deactivates the blocking service.

Referring back to FIG. 5A, when it is determined that the user is not the driver of the vehicle based on the input characteristic data (block 525—NO), the template input signature is updated (block 545). For example, as previously described, message evaluation component 133 uses the input characteristic data to update the template input signature stored in table 430.

Although FIGS. 5A and 5B illustrate an exemplary process 500 of the message blocker service, according to other embodiments, process 500 may include additional operations, fewer operations, and/or different operations than those illustrated in FIGS. 5A and 5B, and described herein. For example, in relation to block 530, a network-side message blocking service may be activated, as previously described. Additionally, for example, in relation to block 540, a network-side message blocking service may be deactivated.

The foregoing description of embodiments provides illustration, but is not intended to be exhaustive or to limit the embodiments to the precise form disclosed. Accordingly, modifications to the embodiments described herein may be possible. For example, the blocking service may include invoking a speech-to-text service and a text-to-speech service. In this way, the user may receive a message and create and transmit a message in a hands-free manner. Additionally, for example, while embodiments have been described in blocking messages, since other forms of navigation and/or interaction between the user and the user device may result in the user being distracted while driving, other forms of disablement on the user device may be performed. For example, assume that the user wishes to read the news while driving to his or her workplace. The blocking service may prevent the user from doing so. In this regard, the blocking service may be configured to prevent various applications from running or from being opened, or any other desired interaction between the user and the user device, when a determination is made that the user is the driver of the vehicle.

Additionally, or alternatively, for example, the message evaluation component may apply different thresholds when comparing the input signature to the template input signature for determining whether the user is the driver of the vehicle or not. According to an exemplary implementation, the different thresholds are based on the motion data (e.g., speed, etc.) pertaining to the user. By way of example, assume that response time field 450 in message evaluation table 430 stores a range of values (e.g., x to y), in which x has a value smaller than y (i.e., x indicates a shorter time period to respond than y). The faster the user is traveling in the vehicle, the message evaluation component may apply the value of x as the threshold of the template input signature for determining that the user is the driver of the vehicle. Conversely, the slower the user is traveling in the vehicle, the message evaluation component may apply the value of y as the threshold of the template input signature.

Additionally, or alternatively, the message evaluation component may apply different "minimum amounts" of input characteristic data to be obtained before generating the input signature. According to an exemplary implementation, the different "minimum amounts" of input characteristic data are based on the motion data. For example, the faster the user is traveling in the vehicle, the message evaluation component may obtain fewer instances of input characteristic data compared to when the user is traveling at a slower speed before comparing the input signature to the template input signature.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A and 5B, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The term "exemplary," as used herein means "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

No element, act, or instruction described in the present application should be construed as critical or essential to the embodiments described herein unless explicitly described as such.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A mobile comprising:
   determining, by a user device, whether a user of the user device is being transported by a vehicle;
   determining, by the user device, whether any of multiple events pertaining to a message application is detected in response to determining that the user is being transported by the vehicle;
   obtaining, by the user device, input characteristic data attributed to the user in response to determining that any of the multiple events is detected,
   wherein the input characteristic data indicates a speed at which the user authors an outbound message, and
   indicates an amount of active input from the user during a time window within which the user authors the outbound message;
   determining, by the user device, whether the user is a driver of the vehicle based on the input characteristic data; and
   blocking the user device from receiving a first inbound message and creating the outbound message in response to determining that the user is the driver of the vehicle.

2. The method of claim 1, wherein the multiple events include a second inbound message received at the user device, a notification that alerts the user that the second inbound message is received at the user device, the user opening the message application, and the user entering an input to author the outbound message via the message application.

3. The method of claim 2, wherein the message application is any of applications, that include a Short Message Service (SMS) application, a Multimedia Message Service (MMS) application, an Enhanced Messaging Service (EMS) application, an electronic mail application, an Instant Messaging application, and a web browser application.

4. The method of claim 1, wherein the input characteristic data indicates an amount of inactive input from the user during the time window within which the user authors the outbound message, a time period that transpires from a time that the user is notified of a second inbound message and a time that an input is received towards responding to the second inbound message of which the user is notified, and a time period that transpires from a time that the user opens the message application to a time that the user begins to author the outbound message.

5. The method of claim 4, further comprising:
   storing, by the user device, the input characteristic data as historical data in response to determining that the user is not the driver of the vehicle; and
   generating, by the user device, a template input signature based on the historical data, wherein the template input signature indicates input characteristics of the user that includes input characteristics of the user when authoring the outbound message while not driving.

6. The method of claim 1, further comprising:
   receiving, by the user device, a request from the user to author an emergency message; and
   overriding the blocking based on the receiving.

7. The method of claim 1, wherein the blocking comprises:
   disabling the message application from being opened by the user, wherein the message application is any applications that include a Short Message Service (SMS) application, a Multimedia Message Service (MMS) application, an Enhanced Messaging Service (EMS) application, an electronic mail application, an Instant Messaging application, and a web browser application; and
   forcing shutdown of any of the applications that are opened.

8. The method of claim 1, wherein the blocking comprises:
transmitting, by the user device, a request to a network device, wherein the request indicates to suspend delivery of inbound messages to the user device, wherein the inbound messages include any of a Short Message Service (SMS) message, a Multimedia Message Service (MMS) message, an Enhanced Messaging Service (EMS) message, and an electronic mail message; and
suspending delivery of inbound messages to the user device based on a receipt of the request.

9. A user device comprising:
a communication interface; a memory,
wherein the memory stores instructions; and
a processor, wherein the processor executes the instructions to:
determine whether a user of the user device is being transported by a vehicle;
determine whether any of multiple events pertaining to a message application is detected in response to a determination that the user is being transported by the vehicle;
obtain input characteristic data attributed to the user in response to a determination that any of the multiple events is detected,
wherein the input characteristic data indicates a speed at which the user authors an outbound message, and
indicates an amount of active input from the user during a time window within which the user authors the outbound message;
determine whether the user is a driver of the vehicle based on the input characteristic data; and
block receipt of a first inbound message and a creation of the outbound message in response to a determination that the user is the driver of the vehicle.

10. The user device of claim 9, wherein the multiple events include a second inbound message received at the user device, a notification output by the user device that alerts the user that the second inbound message is received at the user device, the user opening the message application, and the user entering an input to author the outbound message via the message application.

11. The user device of claim 10, wherein the message application is any of applications, that include a Short Message Service (SMS) application, a Multimedia Message Service (MMS) application, an Enhanced Messaging Service (EMS) application, an electronic mail application, an Instant Messaging application, and a web browser application.

12. The user device of claim 9, wherein the input characteristic data indicates an amount of inactive input from the user during the time window within which the user authors the outbound message, a time period that transpires from a time that the user is notified of a second inbound message and a time that an input is received towards responding to the second inbound message of which the user is notified, and a time period that transpires from a time that the user opens the message application to a time that the user begins to author the outbound message.

13. The user device of claim 12, wherein the processor further executes the instructions to:
store the input characteristic data as historical data in response to a determination that the user is not the driver of the vehicle; and
generate a template input signature based on the historical data, wherein the template input signature indicates input characteristics of the user that includes input characteristics of the user when authoring the outbound message while not driving.

14. The user device of claim 9, wherein when determining whether the user is the driver, the processor further executes the instructions to:
generate an input signature based on the input characteristic data;
compare the input signature to a template input signature, wherein the template input signature indicates input characteristics of the user that includes input characteristics of the user when authoring an outbound message while not driving; and
determine whether the user is the driver based on a result of a comparison between the input signature and the template input signature.

15. The user device of claim 9, wherein the processor further executes the instructions to:
disable the message application from being opened by the user, wherein the message application is any applications that include a Short Message Service (SMS) application, a Multimedia Message Service (MMS) application, an Enhanced Messaging Service (EMS) application, an electronic mail application, an Instant Messaging application, and a web browser application; and
force shutdown of any of the applications that are opened.

16. A non-transitory, storage medium storing instructions executable by a processor of a computational device, which when executed cause the computational device to:
determine whether a user of the computational device is being transported by a vehicle;
determine whether any of multiple events pertaining to a message application is detected in response to a determination that the user is being transported by the vehicle;
obtain input characteristic data attributed to the user in response to a determination that any of the multiple events is detected,
wherein the input characteristic data indicates a speed at which the user authors an outbound message, and
indicates an amount of active input from the user during a time window within which the user authors the outbound message;
determine whether the user is a driver of the vehicle based on the input characteristic data; and
block receipt of a first inbound message and a creation of the outbound message in response to a determination that the user is the driver of the vehicle.

17. The non-transitory, storage medium of claim 16, wherein the multiple events include a second inbound message received at the computational device, a notification that alerts the user that the second inbound message is received at the computational device, the user opening the message application, and the user entering an input to author the outbound message via the message application.

18. The non-transitory, storage medium of claim 17, wherein the message application is any of applications, wherein the applications include a Short Message Service (SMS) application, a Multimedia Message Service (MMS) application, an Enhanced Messaging Service (EMS) application, an electronic mail application, an Instant Messaging application, and a web browser application.

19. The non-transitory, storage medium of claim 16, wherein the input characteristic data indicates an amount of inactive input from the user during the time window within which the user authors the outbound message, a time period that transpires from a time that the user is notified of a second inbound message and a time that an input is received towards responding to the second inbound message of which the user is notified, and a time period that transpires from a time that the user opens the message application to a time that the user begins to author the outbound message.

20. The non-transitory, storage medium of claim 19, further storing instructions executable by the processor of the computational device, which when executed cause the computational device to: store the input characteristic data as historical data in response to a determination that the user is not the driver of the vehicle; and generate a template input signature based on the historical data, wherein the template input signature indicates input characteristics of the user that includes input characteristics of the user when authoring the outbound message while not driving.

* * * * *